United States Patent [19]
Smith et al.

[11] 3,980,661
[45] Sept. 14, 1976

[54] HYDROLYSIS OF NITRILES
[75] Inventors: David W. Smith; Julian Feldman, both of Cincinnati, Ohio
[73] Assignee: National Distillers and Chemical Corporation, New York, N.Y.
[22] Filed: Nov. 5, 1974
[21] Appl. No.: 521,013

[52] U.S. Cl. ..................... 260/295.5 A; 260/557 R; 260/558 R; 260/559 R; 260/559 S; 260/561 R; 260/465 D; 260/561 N; 260/558 D; 260/561 K; 260/558 A; 260/471 R; 260/482 R; 260/404; 252/437; 252/431 P
[51] Int. Cl.² .................................... C07C 102/08
[58] Field of Search ........... 260/558, 557, 559, 561, 260/295.5, 404, 465

[56] References Cited
UNITED STATES PATENTS
3,673,250    6/1972    Rauch et al. ..................... 260/561

*Primary Examiner*—Harry I. Moatz
*Attorney, Agent, or Firm*—Kenneth D. Tremain

[57] ABSTRACT

Nitriles, such as acrylonitrile, are converted to the corresponding amides by a catalytic liquid phase hydrolysis employing as the homogeneous catalyst, the reaction product of a rhodium compound and a thiophosphite.

12 Claims, No Drawings

HYDROLYSIS OF NITRILES

BACKGROUND OF THE INVENTION

It is well known that amides of organic carboxylic acids of the general formula RCONH$_2$ can be prepared from the corresponding acids, esters or acid chlorides by suitable reaction with ammonia. In many instances, the preferred method is to convert the nitrile to the amide by hydrolysis which proceeds in the presence of either acid or base. In most instances, however, it is difficult to isolate the amide because the hydrolysis continues further to form the corresponding acid. This is a result of the fact that the rate of hydrolysis of the amide is faster than that of the nitrile. An alternative procedure is to employ a strong acid, such as cold concentrated sulfuric acid, with the nitrile. This procedure has the disadvantage of requiring a molar excess of acid, and base equivalent to the acid, in order to liberate the amide. Another proposal has been to use an alkaline peroxide but at least an equivalent of peroxide is needed and its high cost makes this method unattractive for commercial usage.

More recently, catalytic processes have been developed for the preparation of amides from nitriles. For example, Goetz et al U.S. Pat. No. 3,670,021 teaches the conversion of organic nitriles to amides by carrying out the hydrolysis reaction in the presence of a noble metal compound such as rhodium chloride which may be employed in the form of a complex thereof with, for example, pyridine, triphenylphosphine, 2,2'-bipyridyl, o-phenanthroline, and the like. A similar process is disclosed in Rauch et al U.S. Pat. 3,673,250 in which a transition metal compound such as rhodium chloride is complexed with an organic phosphine, phosphite such as trialkyl or triarylphosphite, arsine, arsenite, stibine or antimonite. While these catalysts, and particularly the Rauch et al catalysts, exhibit a high initial productivity, a rapid deactivation of the catalyst has been observed.

We have now found a new catalyst system which is useful for the conversion of nitriles into amides with excellent conversions and selectivities and which exhibits a dramatically decreased rate of deactivation.

It is the object of this invention to provide a new catalyst for the catalytic hydrolysis of nitriles to amides with high conversions and selectivities for extended periods of time. This and other objects of the invention will become apparent to those skilled in the art from the following detailed description.

SUMMARY OF THE INVENTION

This invention relates to an improved process for the conversion of organic nitriles to amides, and more particularly to a catalytic hydrolysis of organic nitriles to the corresponding amides utilizing a complex of a rhodium compound and a thiophosphite as the homogeneous catalyst. The preferred complexes are the complexes of rhodium trichloride and triethyltrithiophosphite or trilauryltrithiophosphite. The reaction is preferably carried out in the presence of an organic medium such as pyridine, a tertiary alcohol, tetramethylurea, hexamethylphosphoramide, cyclohexanone, aromatic hydrocarbons and mixtures thereof.

DESCRIPTION OF THE PREFERRED EMBODIMENTS

The nitriles which can be hydrolyzed by the process of this invention include any organic nitriles of the general formula RCN, where R can be alkyl, alkenyl, cycloalkyl, aryl or alkaryl and generally contains 1 to about 20 carbon atoms. The R group can also be substituted by halogen, nitro, hydroxy, ester, carbonyl or cyano radicals. When two or more nitrile groups are present in the molecule, one or both may be converted to amide groups. Specific examples of such nitriles include acetonitrile, propionitrile, isobutyronitrile, stearonitrile, benzonitrile, p-chlorobenzonitrile, toluonitrile, benzoylacetonitrile, cyclohexylcyanide, p-cyanoacetophenone, acrylonitrile, 2-methyleneglutaronitrile, adiponitrile, 1,3-dicyanobutane and phthalonitrile.

The hydrolyzing agent or agents which can be employed include water and oxygenated substances such as alcohols of 1 to 5 carbon atoms such as methanol, ethanol, isopropanol, t-butanol and t-amyl alcohol, glycols of 1 to 6 carbon atoms such as ethylene glycol, propylene glycol and hexalene glycol, glycol monoethers such as the monoethers of ethylene glycol and of diethylene glycol, and glycol monoesters such as the monoacetates. Water is the preferred hydrolytic agent. The molar ratio of the hydrolytic agent to nitrile can range from about 0.1:1 to 100:1, and is preferably about 1:1 to 10:1. Since the hydrolysis reaction is stoichiometric, whichever reactant is present in excess will act as a solvent for the reaction system.

The reaction can be conducted at a temperature of from about 25°–250° C., with a range of about 70°–160° C. being preferred, and a temperature of about 100°–130° C. being most preferred. The reaction can be conducted at atmospheric pressure or under a pressure of up to 5000 psig, with or without an inert gas, such as nitrogen, CO$_2$ or methane, to keep the reactants in the liquid phase.

The catalyst employed in the instant process is the reaction product of a rhodium compound and a thiophosphite. The rhodium compound can be any Rh$^{+3}$ salt such as the chloride, bromide, nitrate or acetylacetonate, any complex of a Rh$^{+3}$ salt such as the triacrylonitrile or tripyridine complexes of RhCl$_3$, any complex of a Rh$^{+1}$ salt such as the 1,5-cyclooctadiene complex of RhCl, and any complex of Rh° such as the cyclooctadiene complex of Rh. The preferred rhodium compound is RhCl$_3$.

The ligands of the present catalyst are the formulas

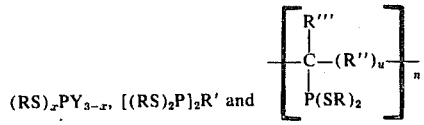

$(RS)_xPY_{3-x}$, $[(RS)_2P]_2R'$ and where R is alkyl of 1–20 carbon atoms or aryl of 6 to 12 carbon atoms or aralkyl of 7–13 carbon atoms; $x$ is 2 or 3; Y is OH or SH or halogen; R' is alkylene of 1–20 carbon atoms, arylene of 6–12 carbon atoms or a divalent aralkyl radical of 7–13 carbon atoms; R" is alkylene of 1–20 carbon atoms, arylene of 6–12 carbon atoms or a divalent aralkyl radical of 7–13 carbon atoms; R'" is H, alkyl of 1–20 carbon atoms, aryl of 6–12 carbon atoms or aralkyl of 7–13 carbon atoms; $u$ is 0 or 1; and $n$ is 3 to 100. Typical ligands include diethyldithiohypophosphorous acid, dilauryldithiohypophosphorous acid, dipropyldithiophosphinite, diphenyldithiophosphinite, ethylene bis(diethyldithiophosphite), phenylene bis (dilauryldithiophosphite), benzylene bis(dioctyldithiophosphite), Polythiophosphite (a polymeric thiophosphite of about 1000 molecular weight manufactured by Weston), triphenyltrithiophosphite, trinaphthyltrithiophosphite, and the like.

The preferred ligands are the trialkyltrithiophosphites in which the alkyl moieties contain 1 to about 20 carbon atoms. Typical compounds include trimethyltrithiophosphite, triethyltrithiophosphite, tripropyltrithiophosphite, tridecyltrithiophosphite, trilauryltrithiophosphite, and the like. The preferred trialkyltrithiophosphites are triethyltrithiophosphite (hereinafter TETTP) and trilauryltrithiophosphite (hereinafter TLTTP).

The ligands can be prepared by any of the processes known heretofore. The amount of such ligand used to prepare the catalyst can range from 0.5–10 mole equivalents based on the amount of rhodium compound. It is preferred to employ at least three, and more preferably at least four molar excess of the ligand over rhodium compound. It is most preferred to use a 4:1 molar ratio of ligand to rhodium compound.

The catalyst complex of the instant invention can be prepared merely by bringing the rhodium compound and the ligand into contact in a suitable solvent, such as one or more of the cosolvents described below, at elevated temperature.

The catalysts of this invention are employed in a catalytic amount which is generally about 0.01–5 weight percent expressed as rhodium based on the weight of the nitrile to be hydrolyzed. Preferably, the catalyst is used in an amount of about 0.25–1.5 weight percent as rhodium based on the weight of the nitrile. The hydrolysis can be effected under either acid or basic conditions although it is preferred to employ mildly basic media. Phosphites are hydrolyzed in stepwise fashion in acidic media to form phosphorous acid and alcohol which contributes to the deterioration of the catalyst. An analogous hydrolysis occurs with thiophosphites but at a much slower rate. The use of mildly basic media acts to retard the slow hydrolysis of the thiophosphites.

It was pointed out above that whichever of the hydrolyzing agent or nitrile is present in stoichiometric excess will act as a solvent for the reaction. It has also been found advantageous to employ certain co-solvents, namely pyridine, tertiary alcohols of 4–10 carbon atoms such as tert-butanol, tetramethylurea, hexamethylphosphoramide, cyclohexanone, aromatic hydrocarbons such as toluene, benzene, xylene, ethylbenzene, cumene, cymene, mesitylene, and mixtures thereof. Agitation may be beneficial. Pyridine is a preferred co-solvent since it has been found that the presence of pyridine, even in minor concentrations, produces a profound effect on the hydrolysis rate using various coordinated rhodium catalysts. Certain mixtures of solvents afford special solubility features which can be used advantageously and among these, the acrylonitrile-pyridine, pyridine-toluene, and pyridine-toluene-acrylonitrile systems deserve mention. The use of a toluene-pyridine solvent system has been found to be beneficial when a rhodium-TLTTP catalyst is employed for several reasons. It has been found that the ligand, metal salt, and final complex are extremely soluble in this system while acrylamide solubility is decreased, and also high catalyst efficiency is obtainable. The amount of the co-solvent which can be used varies over a large range and generally can be about 3–98 weight percent based on the liquid phase and preferably about 15–85 weight percent.

In some preferred embodiments of the invention, it has been found advantageous to employ a small amount of a catalyst promoter. Suitable promoters include phenol, lauryl mercaptan, and $(C_6H_5)_3PO$. These promoters can be utilized in amounts which can range from a very small molar fraction (e.g., 0.1 mole) up to about 1 mole per mole of catalyst.

In order to further illustrate the invention, various Examples are given hereafter. Throughout this specification and claims, all parts and percentages are by weight and all temperatures are in degrees centigrade unless otherwise specified. In these Examples, relative yields are given in relation to the identical procedure performed without the rhodium catalyst but with the ligand.

EXAMPLE 1

Into 10 ml stainless steel tubes were charged 0.1 mmole $RhCl_3 \cdot 3H_2O$, 0.4 mmole TLTTP, 4 ml pyridine, 1–2 g of nitrile and a stoichiometric equivalent amount of water. The tubes were pressurized to 150 psig with nitrogen and heated at 120° C. for 17 hours and then the products were determined. In this manner, benzonitrile was converted to benzamide and nicotinonitrile was converted to nicotinamide. These reactions were repeated on a scale up of about 10-times using methyleneglutaronitrile as the nitrile, 115° C. for 27 hours and a nitrogen pressure of 210 psig to produce 2-methyleneglutaramide.

EXAMPLE 2

In order to compare the effect of various ligands, acrylonitrile was hydrolyzed to acrylamide in agitated reactors containing excess acrylonitrile as solvent at 120° C. with a catalyst of 0.23 mmole rhodium trichloride trihydrate and 0.8 mmole of ligand. One set of reactions were carried out in unpressurized reactors using an initial charge of 10 ml acrylonitrile and 1 ml water followed by the addition of 5 ml acrylonitrile and 1 ml water at the 30 hours mark. A second set of reactions were carried out in pressurized reactors using an initial charge of 15 ml acrylonitrile and 2 ml water and a nitrogen pressure of 50 psig. The time in hours, ligand used, acrylamide produced in grams, and catalyst efficiency in grams amide/grams rhodium/hour are reported in Table I.

TABLE I

| | Time | LIGAND | | | |
| --- | --- | --- | --- | --- | --- |
| | | $(CH_3O)_3P$ | $(Decyl-O)_3P$ | TETTP | TLTTP |
| Unpressurized Reactors Acrylamide produced, grams | 5 | 0.4 | 1.2 | 0.4 | 0.2 |
| | 10 | 0.5 | 1.5 | 0.9 | 0.4 |

TABLE I-continued

|  | Time | LIGAND | | | |
|---|---|---|---|---|---|
|  |  | $(CH_3O)_3P$ | $(Decyl-O)_3P$ | TETTP | TLTTP |
|  | 20 | 0.6 | 1.6 | 1.5 | 0.8 |
|  | 30 | 0.9 | 1.7 | 2.0 | 1.7 |
|  | 50 | 1.0 | 1.7 | 3.2 | 3.7 |
| Catalyst efficiency | 0–5 | 3.2 | 9.4 | 3.0 | 1.7 |
|  | 5–10 | 1.0 | 2.3 | 4.0 | 1.7 |
|  | 10–20 | 0.3 | 0.4 | 2.6 | 1.4 |
|  | 20–30 | 1.1 | 0.7 | 1.8 | 3.8 |
|  | 30–50 | 0.2 | 0.0 | 2.5 | 4.0 |
|  | 0–50 | 0.8 | 1.4 | 2.6 | 3.0 |
| Pressurized Reactors Acrylamide produced, grams | 10 | 3.05 | 2.01 | 3.40 | 2.12 |
|  | 20 | 3.10 | 2.49 | 6.80 | 5.05 |
| Catalyst efficiency | 0–10 | 12.2 | 8.0 | 13.6 | 8.5 |
|  | 10–20 | 0.2 | 1.9 | 13.6 | 11.7 |
|  | 0–20 | 6.2 | 5.0 | 13.6 | 10.1 |

EXAMPLE 3

Acrylonitrile was hydrolyzed to acrylamide by charging 2 ml acrylonitrile, 0.55 ml water and 4 ml t-butanol into 10 ml stainless steel tubes which were then pressurized to 225 psig with nitrogen and heated to 120° C. The catalyst employed was 0.2 mmole $RhCl_3·3H_2O$ complex with 0.8 mmole of ligand. When the ligand employed was TLTTP, the relative acrylamide yield was 59 at the end of 18 hours. When $(CH_3O)_3P$ was used as the ligand, the relative acrylamide yield was 3.6 at the end of 66 hours.

EXAMPLE 4

Example 3 was repeated except that the nitrogen pressure was 100–250 psi. The relative acrylamide yields at the end of 18 hours for the following ligands were found:

| Ligand | Relative Yield |
|---|---|
| $(C_6H_5O)_3P$ | 5.7 |
| $(Allyl-O)_3P$ | 20 |
| $(Decyl-O)_3P$ | 8.1 |
| TLTTP | 59 |

EXAMPLE 5

Example 4 was repeated except that pyridine was used as a co-solvent. The relative acrylamide yields found using three ligands were:

| Ligand | Relative Yield |
|---|---|
| $(CH_3O)_3P$ | 17 |
| $(Allyl-O)_3P$ | 13 |
| TLTTP | 47 |

EXAMPLE 6

A catalyst containing 0.1 mmole $RhCl_3·3H_2O$, 0.4 mmole ligand, 0.34 ml water, 5 ml acrylonitrile and 1 ml pyridine were reacted in stainless steel reactors at 120° C. under 100 psig of nitrogen. The results are shown in Table II.

TABLE II

|  | Time, Hours | LIGAND | | |
|---|---|---|---|---|
|  |  | $(CH_3O)_3P$ | TETTP | TLTTP |
| Acrylamide yield, % | 3 | 35 | 50 | 32 |
|  | 6 | 48 | 81 | 52 |
|  | 21 | 46 | 83 | 92 |
| Selectivity, % | 3 | 81 | 77 | 87 |
|  | 6 | 83 | — | 93 |
|  | 21 | 35 | 69 | 84 |

EXAMPLE 7

Three hydrolysis reactions were carried out employing 0.2 mmole rhodium trichloride trihydrate, 0.8 mmole TLTTP, 2 ml acrylonitrile, 0.55 ml $H_2O$ and 4 ml t-butanol in static, pressurized stainless steel tubes. A reaction temperature of 122° C. was used at the end of 17 hours, the acrylamide yield was determined. In one preparation, no promoter was used; in the other two preparations, either 0.01 g of phenol or 0.04 ml of lauryl mercaptan was added to the reactants. The results were as follows:

| Promoter | Acrylamide Yield, % |
|---|---|
| None | 68 |
| Phenol | 93 |
| Lauryl mercaptan | 88 |

EXAMPLE 8

0.1 mmole of rhodium trichloride hydrate, 0.4 mmole of TLTTP or TETTP ligand, 0.34 ml of water and 5 ml of acrylonitrile (AN) or 5 ml of acrylonitrile plus 1 ml of pyridine (Py) were reacted in static stainless steel reactors at 120° C. under 100 psig of nitrogen and the yield of acrylamide was determined periodically as shown in Table III.

TABLE III

| | LIGAND | | | | |
|---|---|---|---|---|---|
| | TETTP | | TLTTP | | Time, Hours |
| Solvent | AN | AN-Py | A | AN-Py | |
| Acrylamide yield, % | 2 | — | 1 | — | 1.5 |
| | — | 50 | — | 32 | 3 |
| | — | 81 | — | 52 | 6 |
| | 53 | — | 16 | — | 18 |
| | — | — | — | 92 | 21 |
| | 64 | — | 24 | — | 24 |

EXAMPLE 9

Continuous Homogeneous Reaction 2.00g of $RhCl_3 \cdot 3H_2O$, 18 ml of TLTTP, 290 ml of pyridine and 290 ml of toluene were heated with stirring at 110° C. for 2.5 hours. 50 ml of $H_2O$ and 190 ml of acrylonitrile were then added. The resulting mixture was fed continuously through a pressurized (150 psig) cylindrical reactor (200 ml volume) at 122°–125° C. at a rate of 2.3–3.4 ml/min. The reactor effluent was let down into a still to remove water as an acrylonitrile azeotrope. This allowed acrylamide to be removed from the still bottoms via crystallization in a chilled zone followed by filtration to remove the solid acrylamide. The azeotrope from the still overhead and the filtrate from the crystallizer were then recycled to the reactor. As reactants were depleted, fresh water and acrylonitrile were added to the feed.

EXAMPLE 10

In a procedure similar to that of Example 9, the hydrolysis reaction was carried out at reflux (74°–79° C.) in a glass reaction vessel producing acrylamide continuously.

EXAMPLE 11

By the method of Example 5, acrylonitrile was hydrolyzed using 0.1 mmole of $RhCl_3 \cdot 3H_2O$ and 0.3 mmole of Weston 93-P, a low melting polythiophosphite of about 1000 molecular weight, as catalyst. An 18% yield of acrylamide was obtained after 16 hours.

Various changes and modifications can be made in the present invention without departing from the spirit and the scope thereof. The various embodiments set forth herein were for the purpose of further illustrating the invention but were not intended to limit it.

We claim:

1. In a method for the liquid phase catalytic hydrolysis of a nitrile to the corresponding amide, the improvement which comprises employing an effective catalytic amount of the unsupported reaction product of rhodium chloride and a trialkyl trithiophosphite prepared by contact of said rhodium chloride and said trialkyl trithiophosphite in a solvent medium at an elevated temperature.

2. The method of claim 1 wherein the rhodium chloride is rhodium trichloride.

3. The method of claim 1 wherein said hydrolysis is conducted in the presence of an organic medium selected from the group consisting of pyridine, tertiary alcohols, tetramethylurea, hexamethylphosphoramide, cyclohexanone, aromatic hydrocarbons and mixtures thereof.

4. The method of claim 1 wherein said hydrolysis is conducted in the presence of a catalyst promoter selected from the group consisting of phenol, lauryl mercaptan and $(C_6H_5)_3PO$.

5. The method of claim 1 wherein said trialkyltrithiophosphite is triethyltrithiophosphite.

6. The method of claim 1 wherein said trialkyltrithiophosphite is trilauryltrithiophosphite.

7. The method of claim 1 wherein the amount of said catalyst is about 0.01 to 5 weight percent rhodium based on the weight of nitrile to be hydrolyzed.

8. The method of claim 7 wherein the amount of said catalyst is about 0.25 to 1.5 weight percent.

9. The method of claim 1 wherein said catalyst is the reaction product of rhodium trichloride and a trialkyltrithiophosphite selected from the group consisting of triethyltrithiophosphite and trilauryltrithiophosphite.

10. The method of claim 9 wherein the amount of said catalyst is about 0.01 to 5 weight percent rhodium based on the weight of nitrile to be hydrolyzed.

11. The method of claim 10 wherein the amount of said catalyst is about 0.25 to 1.5 weight percent.

12. The method of claim 9 wherein said hydrolysis is conducted in the presence of an organic medium selected from the group consisting of pyridine, tertiary alcohol, tetramethylurea, hexamethylphosphoramide, cyclohexanone, toluene, benzene, xylene, ethylbenzene, cumene, cymene, mesitylene, and mixtures thereof.

* * * * *